(12) United States Patent
Jourdan et al.

(10) Patent No.: US 7,757,065 B1
(45) Date of Patent: Jul. 13, 2010

(54) INSTRUCTION SEGMENT RECORDING SCHEME

(75) Inventors: Stephan J. Jourdan, Portland, OR (US); Ronny Ronen, Haifa (IL); Lihu Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1712 days.

(21) Appl. No.: 09/708,722

(22) Filed: Nov. 9, 2000

(51) Int. Cl.
*G06F 9/30* (2006.01)
(52) U.S. Cl. .................................................. 712/200
(58) Field of Classification Search ................. 712/200
See application file for complete search history.

(56) References Cited

U.S. PATENT DOCUMENTS

| | | | |
|---|---|---|---|
| 4,575,814 A | 3/1986 | Brooks, Jr. et al. | |
| 5,381,533 A | 1/1995 | Peleg et al. | |
| 5,461,699 A | 10/1995 | Arbabi et al. | |
| 5,889,999 A | 3/1999 | Breternitz, Jr. et al. | |
| 5,913,223 A | 6/1999 | Sheppard et al. | |
| 5,924,092 A * | 7/1999 | Johnson ........................ | 707/7 |
| 5,966,541 A | 10/1999 | Agarwal | |
| 5,974,538 A | 10/1999 | Wilmot, II | |
| 6,006,317 A * | 12/1999 | Ramagopal et al. ............ | 712/23 |
| 6,073,213 A * | 6/2000 | Peled et al. ................... | 711/125 |
| 6,076,144 A * | 6/2000 | Peled et al. ................... | 711/125 |
| 6,185,675 B1 | 2/2001 | Kranich et al. | |
| 6,189,140 B1 | 2/2001 | Madduri | |
| 6,216,200 B1 | 4/2001 | Yeager | |
| 6,233,678 B1 | 5/2001 | Bala | |
| 6,279,103 B1 | 8/2001 | Warren | |
| 6,339,822 B1 | 1/2002 | Miller | |
| 6,351,844 B1 * | 2/2002 | Bala ............................ | 717/128 |
| 6,418,530 B2 * | 7/2002 | Hsu et al. ..................... | 712/237 |
| 6,427,188 B1 | 7/2002 | Lyon et al. | |
| 6,496,925 B1 * | 12/2002 | Rodgers et al. .............. | 712/244 |
| 6,507,921 B1 | 1/2003 | Buser et al. | |
| 6,535,905 B1 * | 3/2003 | Kalafatis et al. ............. | 718/108 |
| 6,535,959 B1 | 3/2003 | Ramprasad et al. | |
| 6,578,138 B1 * | 6/2003 | Kyker et al. ................. | 712/241 |
| 6,594,734 B1 * | 7/2003 | Kyker et al. ................. | 711/146 |
| 6,785,890 B2 * | 8/2004 | Kalafatis et al. ............. | 718/108 |
| 6,961,847 B2 * | 11/2005 | Davies et al. ................ | 712/235 |
| 2002/0078327 A1 | 6/2002 | Jourdan et al. | |
| 2002/0104075 A1 * | 8/2002 | Bala et al. ..................... | 717/136 |

OTHER PUBLICATIONS

Jourdan et al, "Extended Block Cache", Proceedings of the Sixth International Symposium on High-Performance Computer Architecture, Jan. 8-12, 2000, Toulouse, France.* www.dictionary.com © 2000. search terms: modification and modify.*

(Continued)

*Primary Examiner*—Aimee J Li
(74) *Attorney, Agent, or Firm*—Kenyon & Kenyon LLP

(57) ABSTRACT

In a front-end system for a processor, a recording scheme for instruction segments stores the instructions in reverse program order. Instruction segments may be traces, extended blocks or basic blocks. By storing the instructions in reverse program order, the instruction segment is easily extended to include additional instructions. The instruction segments may be extended without having to re-index tag arrays, pointers that associate instruction segments with other instruction segments.

19 Claims, 2 Drawing Sheets

OTHER PUBLICATIONS

Rotenberg, Eric; Bennet, Steve; Smith, James E. "A Trace Cache Microarchitecture and Evaluation". IEEE © 1999. pp. 111-120.*

Patel, Sanjay Jeram; Friendly, Daniel Holmes; Patt, Yale N. "Critical Issues Regarding the Trace Cache Fetch Mechanism". © 1997. pp. 1-33.*

Black et al, "The Block-Based Trace Cache", Proceedings of The 26$^{th}$ Int'l. Symposium on Computer Architecture, May 2-4, 1999, Atlanta, Georgia.

Conte et al, "Optimization of Instruction Fetch Mechanisms for High Issue Rates", Proceedings of the 22$^{nd}$ Annual Int'l. Symposium on Computer Architecture, Jun. 22-24, 1995, Santa Margherita Ligure, Italy.

Dutta et al, "Control Flow Prediction with Tree-Like Subgraphs for Superscalar Processors", Proceedings of The 28$^{th}$ Int'l. Symposium on Microarchitecture, Nov. 29-Dec. 1, 1995, Ann Arbor, Michigan.

Friendly et al, "Alternative Fetch and Issue Policies for the Trace Cache Fetch Mechanism", Proceedings of The 30$^{th}$ Annual IEEE/ACM Int'l. Symposium on Microarchitecture, Dec.1-3, 1997, Research Triangle Park, North Carolina.

Intrater et al, "Performance Evaluation of a Decoded Instruction Cache for Variable Instruction-Length Computers", Proceedings of The 19$^{th}$ Annual Int'l. Symposium on Computer Architecture, May 19-21, 1992, Gold Coast, Australia.

Jacobson et al, "Path-Based Next Trace Prediction", Proceedings of The 30$^{th}$ Annual Int'l. Symposium on Microarchitecture, Dec. 1-3, 1997, Research Triangle Park, North Carolina.

McFarling, Scott, "Combining Branch Predictors", Jun. 1993, WRL Technical Note TN-36, Digital Western Research Laboratory, Palo Alto, California.

Michaud et al, "Exploring Instruction-Fetch Bandwidth Requirement in Wide-Issue Superscalar Processors", Proceedings of The 1999 Int'l. Conference on Parallel Architectures and Compilation Techniques, Oct. 12-16, 1999, Newport Beach, California.

Patel et al, "Improving Trace Cache Effectiveness with Branch Promotion and Trace Packing", Proceedings of The 25$^{th}$ Annual Int'l. Symposium on Computer Architecture, Jun. 27-Jul. 1, 1998, Barcelona, Spain.

Reinman et al, "A Scalable Front-End Architecture for Fast Instruction Delivery", Proceedings of The 26$^{th}$ Int'l. Symposium on Computer Architecture, May 2-4, 1999, Atlanta, Georgia.

Rotenberg et al, "Trace Cache: A Low Latency Approach to High Bandwidth Instruction Fetching", Proceedings of The 29$^{th}$ Annual IEEE/ACM Int'l. Symposium on Microarchitecture, MICRO-29, Dec. 2-4, 1996, Paris, France.

Seznec et al, "Multiple-Block Ahead Branch Predictors", Proceedings of The 7$^{th}$ Int'l. Conference on Architectural Support for Programming Languages and Operating Systems, Oct. 1-4, 1996, Cambridge, United States.

Yeh et al, "Increasing the Instruction Fetch Rate via Multiple Branch Prediction and a Branch Address Cache", Proceedings of The 7$^{th}$ Int'l. Conference on Supercomputing, Jul. 1993.

Jourdan et al, "eXtended Block Cache", Intel Corporation, Intel Israel, Haifa, 31015, Israel, pp. 1-10.

Johnson, Mike *Superscalar Microprocessor Design*, Chapter 10, pp. 177-202, PTR Prentice-Hall, Englewood Cliffs, New Jersey, 1991.

Patterson and Hennessey, Computer Organization and Design, 2$^{nd}$ Ed., p. 570, 1998.

Rotenbery et al, "Trace Processors", Proceedings of 30$^{th}$ Annual IEEE/ACM International Symposium on Microarchitecture, pp. 138-148, Dec. 1, 1997.

Bellas et al., "Architectural and Compiler Techniques for Energy Reduction in High Performance Microprocessors," *IEEE Transactions on VLSI*, vol. 8, No. 3, Jun. 2000, pp. 317-326.

Glaskowsky, Peter N., "Pentium 4 (Partially) Previewed," *Microprocessor Report*, vol. 14, Archive 8, Aug. 2000, p. 1, pp. 11-13.

Manne et al., "Pipeline Gating: Speculation Control for Energy Reduction," *ACM SIGARCH, Proceedings of the 25$^{th}$ Annual International Symposium on Computer Architecture*, IEEE Computer Society Tech. Comm. on Computer Architecture, Jun. 27-Jul. 1, 1998, Barcelona, Spain, pp. 132-141.

Papworth, David B., "Tuning the Pentium Pro Microarchitecture," *IEEE Micro*, IEEE Computer Society, vol. 16, No. 2, Apr. 1996, pp. 8-15.

Solomon et al., "Micro-Operation Cache: A Power Aware Frontend for Variable Instruction Length ISA," *ISLPED '01*, Aug. 6-7, 2001, Huntington Beach, CA, pp. 4-9.

Upton, Michael, "The Intel Pentium® 4 Processor," http://www.intel.com/pentium4, Oct. 2000, 15 pp.

* cited by examiner

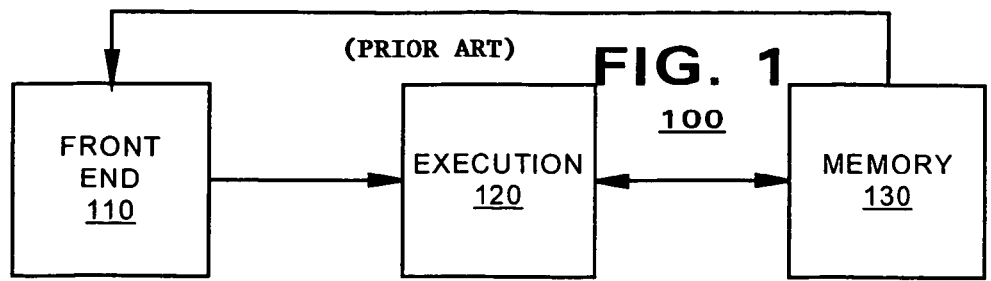
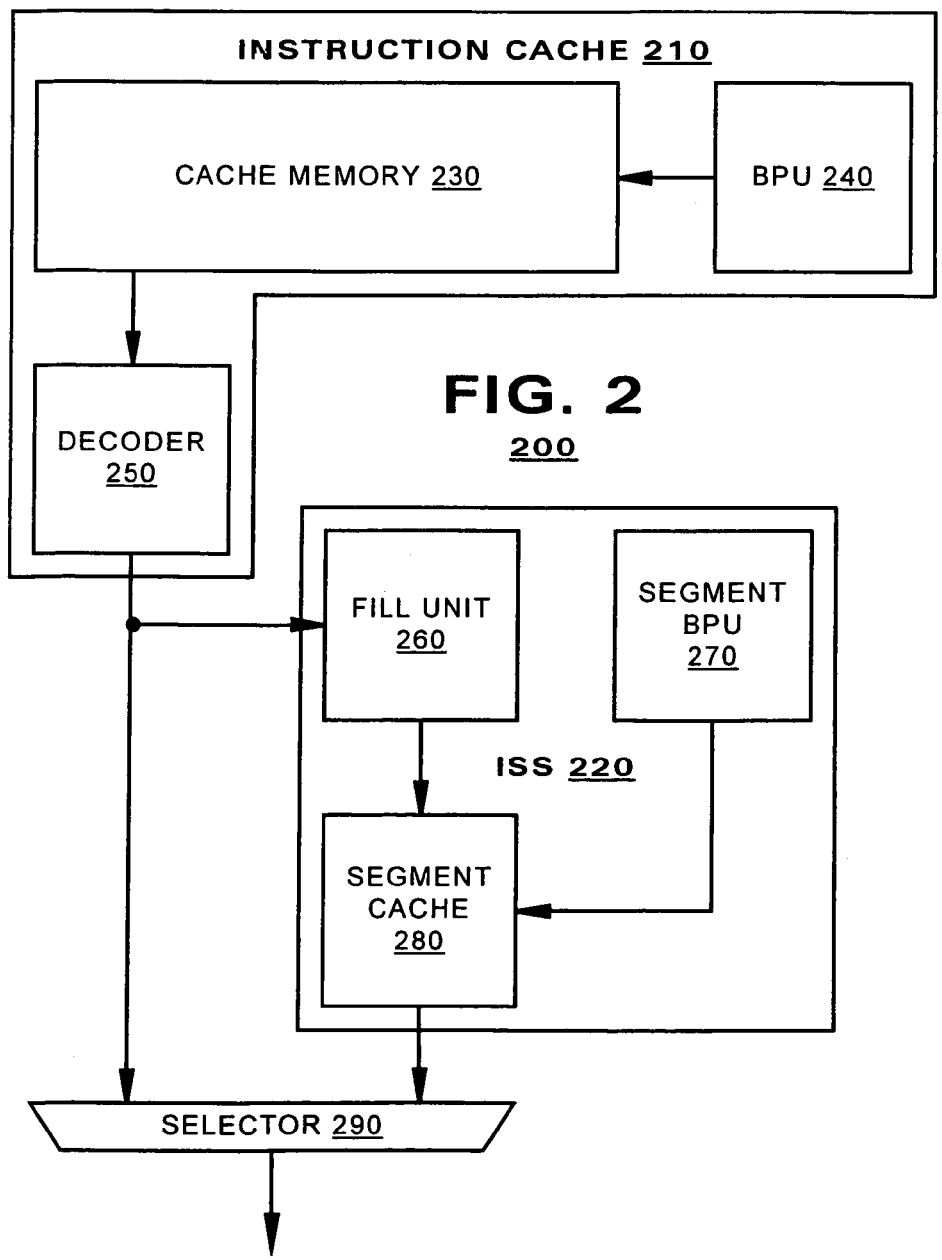

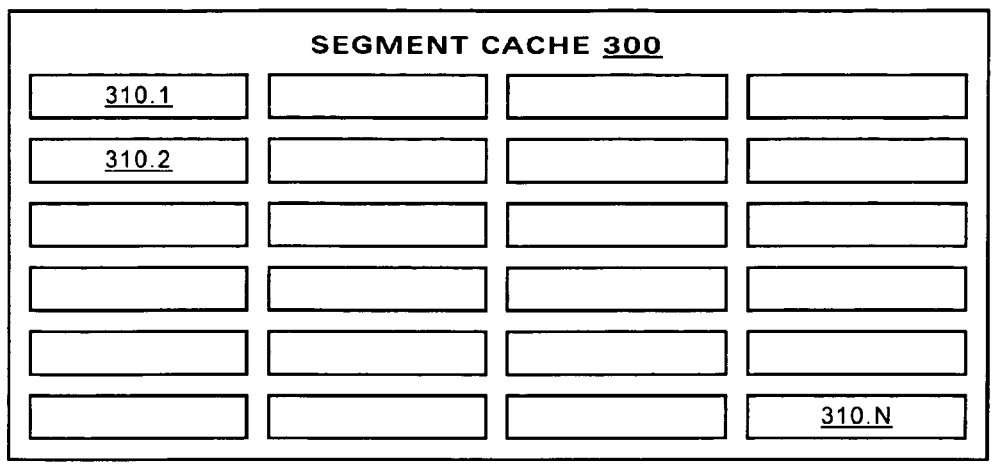
FIG. 3
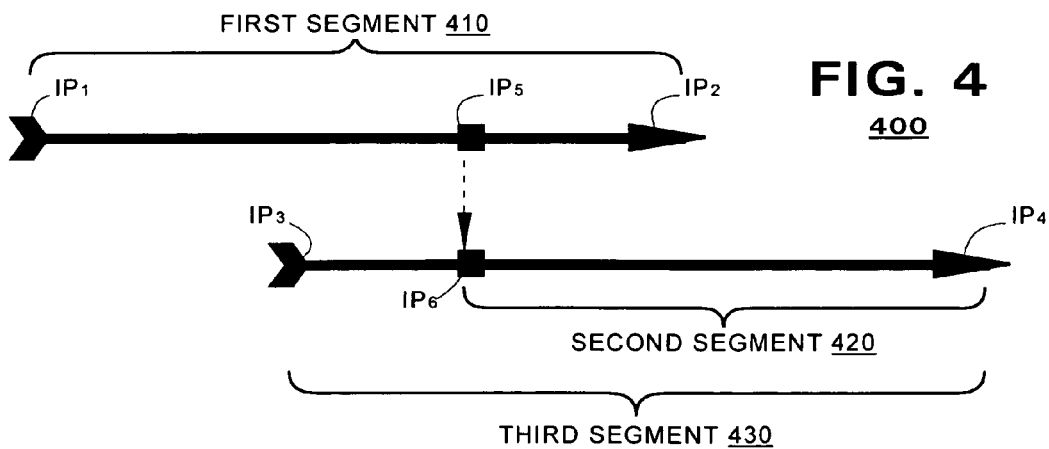
FIG. 4
400
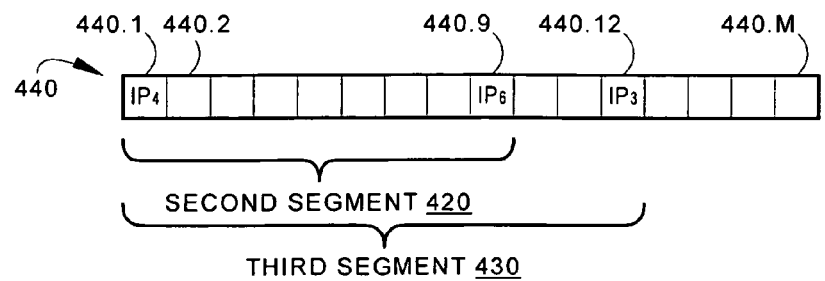

INSTRUCTION SEGMENT RECORDING SCHEME

BACKGROUND

The present invention relates to a recording scheme for instruction segments in a processor core in which instructions from instruction segments may be cached in reverse program order.

FIG. 1 is a block diagram illustrating the process of program execution in a conventional processor. Program execution may include three stages: front end 110, execution 120 and memory 130. The front-end stage 110 performs instruction pre-processing. Front end processing is designed with the goal of supplying valid decoded instructions to an execution core with low latency and high bandwidth. Front-end processing can include branch prediction, decoding and renaming. As the name implies, the execution stage 120 performs instruction execution. The execution stage 120 typically communicates with a memory 130 to operate upon data stored therein.

Conventionally, front end processing 110 may build instruction segments from stored program instructions to reduce the latency of instruction decoding and to increase front-end bandwidth. Instruction segments are sequences of dynamically executed instructions that are assembled into logical units. The program instructions may have been assembled into the instruction segment from non-contiguous regions of an external memory space but, when they are assembled in the instruction segment, the instructions appear in program order. The instruction segment may include instructions or uops (micro-instructions).

A trace is perhaps the most common type of instruction segment. Typically, a trace may begin with an instruction of any type. Traces have a single entry, multiple exit architecture. Instruction flow starts at the first instruction but may exit the trace at multiple points, depending on predictions made at branch instructions embedded within the trace. The trace may end when one of number of predetermined end conditions occurs, such as a trace size limit, the occurrence of a maximum number of conditional branches or the occurrence of an indirect branch or a return instruction. Traces typically are indexed by the address of the first instruction therein.

Other instruction segments are known. The inventors have proposed an instruction segment, which they call an "extended block," that has a different architecture than the trace. The extended block has a multiple-entry, single-exit architecture. Instruction flow may start at any point within an extended block but, when it enters the extended block, instruction flow must progress to a terminal instruction in the extended block. The extended block may terminate on a conditional branch, a return instruction or a size limit. The extended block may be indexed by the address of the last instruction therein.

A "basic block" is another example of an instruction segment. It is perhaps the most simple type of instruction segment available. The basic block may terminate on the occurrence of any kind of branch instruction, including an unconditional branch. The basic block may be characterized by a single-entry, single-exit architecture. Typically, the basic block is indexed by the address of the first instruction therein.

Regardless of the type of instruction segment used in a processor 110, the instruction segment typically is cached for later use. Reduced latency is achieved when program flow returns to the instruction segment because the instruction segment may store instructions already assembled in program order. The instructions in the cached instruction segment may be furnished to the execution stage 120 faster than they could be furnished from different locations in an ordinary instruction cache.

While the use of instruction segments has reduced execution latency, they tend to exhibit a high degree of redundancy. A segment cache may store copies of a single instruction in multiple instruction segments, thereby wasting space in the cache. The inventors propose to reduce this redundancy by merging one or more segments into a larger, aggregate segment or by extending one instruction segment to include instructions from another instruction segment with overlapping instructions. However, extension of segments is a non-trivial task, for several reasons.

First, instructions typically are cached in program order. To extend instruction segments at the beginning of the segment would require previously stored instructions to be shifted downward through a cache to make room for the new instruction. The instructions may be shifted by varying amounts, depending upon the number of new instructions to be added. This serial shift may consume a great deal of time which may impair the effectiveness of the front-end stage 110.

Additionally, the extension may destroy previously established relationships among the instruction segments. Instruction segments not only are cached, but they also are indexed by the front-end stage 110 to identify relationships among themselves. For example, program flow previously may have exited a first segment and arrived at a second segment. A mapping from the first instruction segment to the second instruction segment may be stored by the front-end stage 110 in addition to the instruction segments themselves. Oftentimes, the mappings simply are pointers from one instruction segment to the first instruction in a second instruction segment.

Extension of instruction segments, however, may cause new instructions to be added to the beginning of the segment. In such a case, an old pointer to the segment must be updated to circumvent the newly added instructions. If not, if the old mapping were used, the front-end stage 110 would furnish an incorrect set of instructions to the execution stage 120. The processor 100 would execute the wrong instructions.

Accordingly, there is a need in the art for a front-end processing system that permits instruction segments to be extended dynamically without disruption to previously stored mappings among the instruction segments.

BRIEF DESCRIPTION OF THE DRAWINGS

FIG. 1 is a block diagram illustrating the process of program execution in a conventional processor.

FIG. 2 is a block diagram of a front end processing system according to an embodiment of the present invention.

FIG. 3 is a block diagram of a segment cache according to an embodiment of the present invention.

FIG. 4 illustrates a relationship between exemplary segment instructions a cache bank according to the embodiments of the present invention.

DETAILED DESCRIPTION

Embodiments of the present invention provide a recording scheme for instruction segments that store the instruction in reverse program order. By storing the instruction in reverse program order, it becomes easier to extend the instruction segment to include additional instructions. The instruction segments may be extended without having to re-index tag arrays, pointers that associate instruction segments with other instruction segments.

FIG. 2 is a block diagram of a front end processing system 200 according to an embodiment of the present invention. The front end 200 may include an instruction cache 210 and an instruction segment engine ("ISS") 220. The instruction cache 210 may be based on any number of known architectures for front-end systems 200. Typically, they include an instruction memory (or cache) 230, a branch prediction unit ("BPU") 240 and an instruction decoder 250. Program instructions may be stored in the cache memory 230 and indexed by an instruction pointer. Instructions may be retrieved from the cache memory 230, decoded by the instruction decoder 250 and passed to the execution unit (not shown). The BPU 240 may assist in the selection of instructions to be retrieved from the cache memory 230 for execution. As is known, instructions may be indexed by an address, called an "instruction pointer" or "IP."

According to an embodiment, an ISS 220 may include a fill unit 260, a segment branch prediction unit (or "segment BPU") 270 and a segment cache 280. The fill unit 260 may build the instruction segments. The segment cache 280 may store the instruction segments. The segment BPU 270 may predict which instruction segments, if any, are likely to be executed and may cause the segment cache 280 to furnish any predicted segment to the execution unit. The segment BPU 270 may store masks associated with each of the instruction segments stored by the segment cache 280, indexed by the IP of the terminal instruction of the instruction segments.

The ISS 220 may receive decoded instructions from the instruction cache 210. The ISS 220 also may pass decoded instructions to the execution unit (not shown). A selector 290 may select which front-end source, either the instruction cache 210 or the ISS 220, will supply instructions to the execution unit. In an embodiment, the segment cache 280 may control the selector 290.

According to an embodiment, a hit/miss indication from the segment cache 280 may control the selector 290.

FIG. 3 is a block diagram of a segment cache 300 according to an embodiment of the present invention. The segment cache 310 may be populated by a plurality of cache lines 310.1, 310.2, . . . 310.N, each of which may store an instruction segment. The segment cache 310 may be constructed from any number of cache structures, including for example a set-associative cache or a banked cache among others. According to an embodiment, the segment cache 300 may output a cache line in response to addressing data (not shown) input to the segment cache 300.

FIG. 4 illustrates a relationship between exemplary segment instructions and the manner in which they may be stored in a cache line according to the embodiments of the present invention. In the example of FIG. 4, two different instruction streams are stored in different locations of the instruction cache (FIG. 2, 210). Assume that the first instruction stream extends from a location $IP_1$ to $IP_2$ and the second instruction stream extends from location $IP_3$ to $IP_4$. Assume further that a conditional branch in the first instruction stream at location $IP_6$ may cause program flow to jump to location $IP_6$ in the second instruction stream. For purposes of this example, it also may be assumed that return instructions are located at instruction $IP_2$ and $IP_4$. It further may be assumed that the ISS (FIG. 2, 220) does not store any previously created instruction segments.

During execution, a first segment may begin when program flow advances to location $IP_1$ (as by, for example, a conditional branch). Instructions may be retrieved from the instruction cache 210 until the program flow advances to the conditional branch instruction at location $IP_6$. Assume that the conditional branch is taken, causing program flow to advance to location $IP_6$. In an extended block system, for example, the conditional branch would cause the instruction segment to terminate and a new segment to be created starting at location $IP_6$. The first instruction segment may be stored in a line of the segment cache (say, 310.2 of FIG. 3).

Program flow may advance from location $IP_6$ to the return instruction at location $IP_4$. The return instruction would terminate a second instruction segment 420, causing the ISS (FIG. 2, 220) to store the second instruction segment 420 in another cache line 440. The instructions may be recorded terminal instruction first, then in reverse program order. Thus, the terminal instruction from location $IP_4$ may be stored in a first position 440.1 of the cache line 440. The instructions may be stored in reverse program order in advancing locations of the cache line 440 until the instructions are exhausted. In the example of FIG. 4, the instruction at location $IP_6$ is shown stored in position 440.9 in the cache line 440. The second instruction segment 420 need not occupy the full width of the cache line 440. The first instruction segment 410, when stored in the segment cache 300, also may be stored in reverse program order.

Assume that program flow advances to the instruction at location $IP_3$ at some later time. Instructions may be retrieved from the instruction cache (FIG. 2, 210) until the program flow advances to the return instruction at location $IP_4$. The ISS (FIG. 2, 220) may construct a third instruction segment 430 extending from location $IP_3$ to $IP_4$. Rather than store the third instruction segment 430 in a separate cache line, the ISS 220 instead may extend the second instruction segment 420 to include the additional instructions from the third instruction segment 430. This occurs simply by writing the excess instructions, those from location $IP_3$ to location $IP_6$, at the end of the cache line 440 in reverse instruction order. In an embodiment, if the second instruction segment is subsumed entirely within the third instruction segment, the fastest way of extending the instruction segment is simply to write the third segment 420 into the cache line 440. In this embodiment, the instructions of the second segment are overwritten with identical data.

Returning to FIG. 2, as described above, a segment BPU 270 may store addressing data for each instruction segment stored in the segment cache 280. Based on instruction flow, the segment BPU 270 may predict a next instruction segment to be retrieved from the segment cache 280. The segment BPU 270 may output address data to the segment cache 280 to cause the cache to output an instruction segment. In this regard, the segment BPU 270 operates in a manner that may be considered somewhat analogous to the BPU 240.

The recording scheme of the present invention permits instruction segments to be merged without requiring corresponding manipulation of the mappings stored in the segment BPU 270. Continuing with the example provided in FIG. 4, when the second instruction segment 420 is stored in the cache bank 310, the mapping in the segment BPU 270 may reflect the IP of the terminal instruction ($IP_4$) and run length data identifying the number of instructions contained in the second segment 420. When the second and third instruction segments 420, 430 merge, the mapping for the second instruction segment 420 remains valid. Additional information may be stored regarding the third instruction segment 430 to identify the IP of the terminal instruction (again, $IP_4$) and the length of the instruction segment. Thus, the reverse-order-recording scheme provided by the foregoing embodiments facilitates segment extension without requiring a re-indexing of previously stored segments.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A cache comprising:
a first cache line to store an instruction segment further comprising a plurality of instructions, each instruction of the plurality of instructions is stored in sequential positions of the first cache line in reverse program order, wherein a conditional branch causing program flow to jump from a first location in a first instruction stream to a second location in a second instruction stream causes a terminal instruction from the second instruction stream to be stored in a first position of a second cache line.

2. The cache of claim 1, wherein the instruction segment is an extended block.

3. The cache of claim 1, wherein the instruction segment is a trace.

4. The cache of claim 1, wherein the instruction segment is a basic block.

5. A segment cache for a front-end system in a processor, comprising a plurality of cache entries to store instructions of instruction segments, each instruction of an instruction segment is stored in reverse program order in a first cache line, wherein a conditional branch causing program flow to jump from a first location in a first instruction stream to a second location in a second instruction stream causes a terminal instruction from the second instruction stream to be stored in a first position of a second cache line.

6. The segment cache of claim 5, further comprising:
an instruction cache system,
an instruction segment system, comprising:
a fill unit provided in communication with the instruction cache system, and
a selector coupled to an output of the instruction cache system and to an output of the segment cache.

7. The segment cache of claim 6, wherein the instruction segment system further comprises a segment predictor provided in communication with the segment cache.

8. A method comprising:
building an instruction segment based on program flow, and
storing instructions of the instruction segment in a cache entry, each instruction of the instruction segment is stored in reverse program order in a first cache line, wherein a conditional branch causing program flow to jump from a first location in a first instruction stream to a second location in a second instruction stream causes a terminal instruction from the second instruction stream to be stored in a first position of a second cache line.

9. The method of claim 8, further comprising:
building a second instruction segment based on program flow, and
if the first and second instruction segments overlap, extending the first instruction segment to include non-overlapping instructions from the second instruction segment.

10. The method of claim 9, wherein the extending comprises storing the non-overlapping instructions in the cache in reverse program order in successive cache positions adjacent to the instructions from the first instruction segment.

11. The method of claim 8, wherein the instruction segment is an extended block.

12. The method of claim 8, wherein the instruction segment is a trace.

13. The method of claim 8, wherein the instruction segment is a basic block.

14. A processing engine, comprising:
a front end stage to build and store instruction segments, each instruction of an instruction segment is stored in reverse program order in a first cache line, wherein a conditional branch causing program flow to jump from a first location in a first instruction stream to a second location in a second instruction stream causes a terminal instruction from the second instruction stream to be stored in a first position of a second cache line, and
an execution unit in communication with the front end stage.

15. The processing engine of claim 14, wherein the front-end stage comprises:
an instruction cache system,
an instruction segment system, comprising:
a fill unit provided in communication with the instruction cache system,
a segment cache, and
a selector coupled to an output of the instruction cache system and to an output of the segment cache.

16. The processing engine of claim 15, wherein the instruction segments are extended blocks.

17. The processing engine of claim 15, wherein the instruction segments are traces.

18. The processing engine of claim 15, wherein the instruction segments are basic blocks.

19. The processing engine of claim 15, wherein the instruction segment cache system further comprises a segment predictor provided in communication with the segment cache.

* * * * *